United States Patent
Daeubel et al.

(10) Patent No.: US 8,733,158 B2
(45) Date of Patent: May 27, 2014

(54) METHOD AND DEVICE FOR DETERMINING THE COMPOSITION OF A FUEL MIXTURE

(71) Applicant: Robert Bosch GmbH, Stuttgart (DE)

(72) Inventors: Ralf Daeubel, Markgroeningen (DE); Michael Haufer, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/670,681

(22) Filed: Nov. 7, 2012

(65) Prior Publication Data

US 2013/0118241 A1    May 16, 2013

(30) Foreign Application Priority Data

Nov. 11, 2011  (DE) .......................... 10 2011 086 146

(51) Int. Cl.
    *G01M 15/08*    (2006.01)
(52) U.S. Cl.
    USPC ....................................... 73/114.16
(58) Field of Classification Search
    USPC ...................... 73/23.31, 35.02, 61.47, 114.55
    See application file for complete search history.

(56) References Cited

U.S. PATENT DOCUMENTS

| | | | | |
|---|---|---|---|---|
| 4,905,649 | A * | 3/1990 | Washino et al. | 123/435 |
| 7,963,156 | B2 * | 6/2011 | Boerkel | 73/114.55 |
| 8,032,294 | B2 * | 10/2011 | Loeffler et al. | 701/111 |
| 8,068,971 | B2 * | 11/2011 | Hamedovic et al. | 701/103 |
| 2008/0289401 | A1 | 11/2008 | Boerkel | |
| 2009/0223485 | A1 * | 9/2009 | Hamedovic et al. | 123/435 |
| 2009/0281708 | A1 * | 11/2009 | Loeffler et al. | 701/103 |
| 2009/0306875 | A1 | 12/2009 | Jiang et al. | |
| 2011/0093181 | A1 | 4/2011 | Ciaravino et al. | |

* cited by examiner

*Primary Examiner* — Freddie Kirkland, III
(74) *Attorney, Agent, or Firm* — Michael Best & Friedrich LLP

(57) ABSTRACT

A method for determining the composition of a fuel mixture consisting of a first fuel and a second fuel to operate an internal combustion engine having at least one cylinder pressure sensor for determining the cylinder pressure in at least one cylinder of the internal combustion engine. The calorific value of the fuel mixture or a characteristic variable correlating to said calorific value is determined from the cylinder pressure and the composition of the fuel mixture is determined from said calorific value or the characteristic variable correlating to said calorific value.

8 Claims, 1 Drawing Sheet of a fuel mixture consisting of a first and a second fuel for operating an internal combustion engine having at least one cylinder pressure sensor for determining the cylinder pressure in at least one cylinder of the internal combustion engine.

METHOD AND DEVICE FOR DETERMINING THE COMPOSITION OF A FUEL MIXTURE

BACKGROUND OF THE INVENTION

The invention relates to a method for determining the composition of a fuel mixture consisting of a first and a second fuel for operating an internal combustion engine having at least one cylinder pressure sensor for determining the cylinder pressure in at least one cylinder of the internal combustion engine.

The invention further relates to a device for determining the composition of a fuel mixture consisting of a first fuel and a second fuel for operating an internal combustion engine, wherein the internal combustion engine has at least one cylinder pressure sensor for determining the cylinder pressure in at least one cylinder of the internal combustion engine. Said device comprises a control unit for controlling the internal combustion engine, for determining an indicated mean effective pressure $p_{mi}$ and an indicated work $W_i$ during the high pressure loop of a work cycle from the signals of the cylinder pressure sensor and for determining the injected fuel quantity.

Internal combustion engines on the basis of Otto engines are generally operated with fuel from hydrocarbons from fossil fuels based on refined crude oil. Alcohol produced from renewable resources (plants), for example ethanol or methanol, is increasingly being added in various mixing ratios to this fuel. Depending on the market, the ethanol proportion in fuel mixtures lies in a wide range from 0% to 85%. An operation with pure ethanol is likewise conceivable (Brazil). In the USA and Europe a mixture of 75-85% ethanol and 15-25% gasoline is often distributed under the trade name E85. By adding pure gasoline, all fuel compositions under an ethanol proportion of 85% can thereby result.

The internal combustion engines are designed in such a way that they can be operated with pure gasoline as well as with mixtures up to E85 without serious restrictions and retrofittings. The operating parameters of the internal combustion engine have to be adapted to the respectively existing fuel mixture for an efficient operation with only a small discharge of toxic emissions to occur while a high degree of engine performance is maintained at the same time. A stoichiometric air-fuel mixture ratio is by way of example present at 14.7 volumetric parts of air per part of gasoline; however, when using ethanol, a proportion of air of 9 volumetric parts must be set. For this purpose, it is known how to determine a corresponding adaptation or correction value with the aid of the so-called mixture adaptation, which is based on the signal of a lambda or oxygen probe in the exhaust gas tract of the internal combustion engine, and thus how to adapt the air/fuel ratio to the fuel composition. This requires however a very large adjusting range of the mixture adaptation. Only limited correction options are then often available for shifts in lambda resulting from tolerances in the fuel path (fuel pressure error, flow error of the injection valves) or in the air path (air mass error resulting from tolerances of the hot-film air-mass meter (HFM) or from pressure sensors).

On account the different burning behavior of ethanol and gasoline, the necessity further arises to perform a control of the ignition of the internal combustion engine which is independent of the ethanol content of the fuel mixture.

It is therefore known how to determine the composition of the fuel mixture using separate sensors and correspondingly how to take this information into account in the engine management system. For this purpose, different fuel type sensors, also denoted as "fuel composition sensors", are used. Fuel composition sensors use the different properties of alcohol and gasoline to determine the fuel composition. Ethanol is then, for example, a protic solvent which contains hydrogen ions and has a large permittivity, albeit dependent on the water content. Gasoline on the other hand is an aprotic solvent with a small permittivity. Based on this fact, there are fuel composition sensors, which determine the fuel composition using the dielectric properties of the fuel mixture. Other fuel composition sensors use the different optical characteristics of the fuels, for example the different refractive indices. The use of additional sensors entails however increased costs.

In order to optimize the ignition, alternative methods are known, in which thermodynamic auxiliary quantities, which are formed with the aid of the signals of cylinder pressure sensors, are adjusted to predetermined nominal values. The ignition can thereby be set to optimal values without explicit knowledge of the composition of the fuel mixture.

The German patent publication DE 10 2007 060 223 A1 describes a method for determining the composition of a fuel mixture consisting of a first fuel and a second fuel or for determining the quality of a fuel for operating an internal combustion engine having at least one cylinder pressure sensor in at least one cylinder of the internal combustion engine for determining the pressure course during a combustion stroke and a cylinder pressure based engine regulation for regulating the load and combustion position of said internal combustion engine. It is thereby provided that the determination of the composition of the fuel mixture or the quality of the fuel takes place with the aid of regulating information of the cylinder pressure based engine regulation. The invention proposes that the determination of the composition of the fuel mixture or the quality of the fuel takes place on the basis of manipulated variable corrections and/or regulation deviations of the cylinder pressure based engine regulation.

The German patent publication DE 10 2007 023 900 A1 describes a method for determining the composition of a fuel mixture consisting of a first fuel and a second fuel for operating an internal combustion engine, wherein the first and the second fuel provide different rates of combustion and/or different specific energy contents and wherein the internal combustion engine provides at least one pressure sensor in at least one combustion chamber, with which a temporal and/or angle synchronic pressure course is determined in the combustion chamber. Provision is thereby made for the composition of the fuel mixture to be determined from the temporal and/or angle synchronic pressure course of the gas pressure in the at least one combustion chamber during a combustion phase.

SUMMARY OF THE INVENTION

It is the aim of the invention to provide a method which facilitates a reliable and cost effective detection of the composition of a fuel mixture consisting of at least two fuels.

It is furthermore the aim of the invention to provide a device for carrying out the method.

The aim of the invention relating to the method is thereby met in that the calorific value of the fuel mixture or a characteristic variable correlating to the calorific value is determined and in that the composition of the fuel mixture is determined from the calorific value or the characteristic variable correlating to said value. It is thereby assumed that the calorific values of the first fuel and the second fuel are different, as is the case, for example, for a gas-ethanol mixture. The calorific value of gas is 42.8 MJ/kg and that of ethanol is 26.8 MJ/kg. A corresponding calorific value is associated with each mixture ratio between the first and the second fuel. If this correlation is known, the composition of the existing fuel mixture can be explicitly inferred at a known calorific value of said fuel mixture. Because the calorific value is determined from the current course of the cylinder pressure, said calorific value corresponds to the fuel mixture being currently injected. A change in the fuel mixture is therefore detected within a few work cycles of the internal combustion engine. Corrections necessary for controlling the combustion engine can therefore be carried out quickly and in a cause-specific manner. If a cylinder pressure sensor is already provided in the combustion engine for other controlling tasks, no additional components are then necessary for carrying out the method, which accordingly can be implemented in a cost effective manner. Expenditures for cost intensive fuel type sensors, for example in the form of an ethanol sensor, can be saved.

Provision can be made corresponding to an especially preferred variant of the embodiment of the invention for the indicated mean effective pressure $p_{mi}$ to be determined from the course of the cylinder pressure, for the mean indicated work $W_i$ to be determined from the indicated mean effective pressure $p_{mi}$, for the calorific value or the characteristic variable correlating to said calorific value to be determined from the mean indicated work $W_i$ and a fuel quantity injected during the respective work cycle and for the composition of the fuel mixture to be determined from said calorific value or the characteristic variable correlating thereto. The indicated mean effective pressure $p_{mi}$ is calculated as the mean value over the measured cylinder pressure during a working stroke, minus the mean value of the measured cylinder pressure over a compression stroke. Said indicated mean effective pressure $p_{mi}$ can be simply determined from the signal of the cylinder pressure sensor, e.g., by a control unit associated with the internal combustion engine. Said indicated mean effective pressure $p_{mi}$ is directly dependent on the energy released by the combustion process, and therefore the mean indicated work $W_i$ can be ascertained therefrom when the cylinder volume is known. The calorific value results from the quotient of the mean indicated work $W_i$ and the fuel quantity injected during the combustion cycle. The fuel ratio of the fuel mixture can be determined by means of the explicit correlation between the composition of the fuel mixture and the calorific value thereof.

The accuracy of the determination of the composition of the fuel mixture can thereby be improved by an averaging taking place over different cylinders and/or a plurality of combustion cycles when determining the calorific value or the characteristic variable correlating to said calorific value. The averaging can thereby, for example, take place over consecutively determined calorific values or indicated mean effective pressures $X_{mi}$ or indicated work cycles $W_i$. In order to perform averaging over different cylinders, cylinder pressure sensors are correspondingly necessary in the respective cylinders.

In order to avoid erroneous calorific value results, appropriate conditions must be maintained. For this purpose, provision can be made for the determination of the composition of the fuel mixture to take place after a check of error conditions with regard to the pressure in the fuel system and/or with regard to sufficiently long injection valve opening times and/or with regard to the course of combustion. Errors in the fuel system can be detected by checking the pressure in said fuel system. Sufficiently long injection valve opening times minimize tolerance errors in the injection valves. A valid course of combustion can, for example, be monitored via the position of the center of combustion or the position and height of the peak pressure.

When determining the calorific value and consequently the composition of the fuel mixture, the injected fuel quantity is needed. In order to improve the accuracy of the pilot-controlled fuel mass calculation from the injection time, provision can be made for the determined calorific value and/or the characteristic variable correlating to the calorific value and/or the composition of the fuel mixture to be fed back and taken into account when calculating the injected fuel quantity.

In order to optimize and validate the results, provision can be made for the determined calorific value or the determined characteristic variable correlating to the calorific value to be checked to determine whether said value or respectively the variable correlating to said value has exceeded a theoretical maximum value or has undershot a theoretical minimum value. Tolerances can thereby be further qualified. When the minimum value is undershot, a water content that is too high can also be inferred when a combustion curve analysis of the use of pure ethanol as fuel is simultaneously taken into consideration.

The aim of the invention relating to the device is thereby met in that a circuit arrangement or a program sequence for determining the calorific value of the fuel mixture as the quotient of the indicated Arbeit $W_i$ and the injected fuel quantity is provided, in that data regarding the correlation between the calorific value and the composition of the fuel mixture are deposited in the control unit and in that a program sequence for determining the composition of the fuel mixture from the determined calorific value and the data regarding the correlation between said calorific value and the composition of the fuel mixture is provided. The data regarding the correlation between the calorific value and the composition of the fuel mixture can thereby, for example, be deposited in the form of a calculation specification or a table of values. The calculation of the calorific value therefore takes place on the basis of data which are already available to the control unit in internal combustion engines which are equipped with cylinder pressure sensors.

The method and the device can advantageously be used for determining the composition of a fuel mixture consisting of gasoline and ethanol.

BRIEF DESCRIPTION OF THE DRAWINGS

The invention is explained below in detail using an exemplary embodiment depicted in the figures. In the drawings.

DETAILED DESCRIPTION

Figure 1:
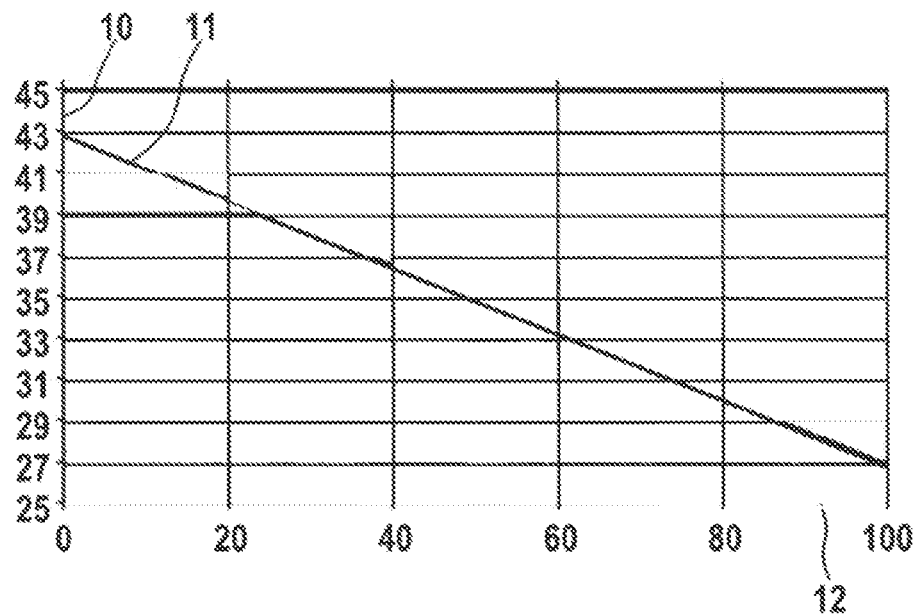
FIG. 1 shows a diagram regarding the correlation between the calorific value and the ethanol content for fuel mixtures consisting of gasoline and ethanol.

FIG. 1 shows a diagram regarding the correlation between the calorific value 11 and the ethanol content for fuel mixtures consisting of gasoline and ethanol. For this purpose, the calorific value 11 is depicted in percent with respect to an axis: Calorific Value 10 and an axis: Ethanol Value 12.

Pure gasoline has a calorific value of 42.8 MJ/kg; pure ethanol has a calorific value of 26.8 MJ/kg. Between these two points, there is a linear relationship between the mixture ratio and the calorific value. If the calorific value 11 of the fuel mixture is known, the ethanol content and hence the composition of the fuel mixture can be directly inferred. Thus, a calorific value 11 of 40.4 MJ/kg results, for example, in an ethanol content of 15% in the fuel mixture.

Figure 2:
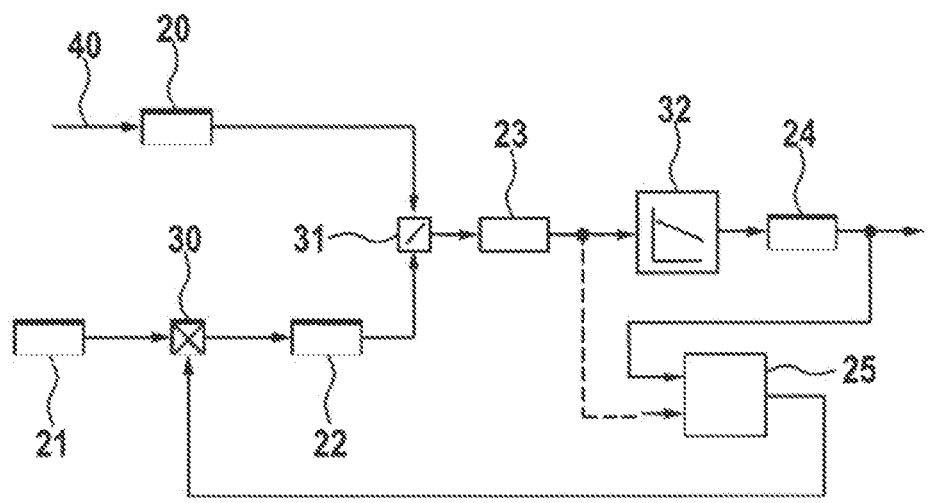
FIG. 2 shows a block diagram with regard to the sequence for determining the composition of a fuel mixture consisting of two fuels.

FIG. 2 shows a block diagram of the sequence for determining the composition of a fuel mixture consisting of gasoline and ethanol as said sequence can be implemented in a control device for an internal combustion engine.

A cylinder pressure 40 is supplied to a first block 20 as the output signal of a cylinder pressure sensor. The cylinder pressure 40 is measured in a cylinder of an internal combustion engine that is not depicted.

In the first block 20, an indicated work $W_i$ is determined according to known methods from the course of the cylinder pressure 40 as said work $W_i$ is realized from the currently injected fuel in the cylinder. The indicated work $W_i$ is supplied to a divider 31.

In a second block 21, an effective injection time $t_e$ is made available which indicates how long the fuel mixture was effectively injected into the cylinder in the current combustion cycle. An injection mass, which is deposited in a third block 22, is determined from the aforementioned effective injection time $t_e$ in a multiplier 30. The injection mass is the injection mass which was supplied to the cylinder in the current combustion cycle. Said injection mass is provided to the divider 31.

In the divider 31, the calorific value 11, which is deposited in the fourth block 23, is calculated by means of dividing the indicated work $W_i$ by the injection mass. At a reference junction 32, the ethanol content of the currently present gasoline-ethanol mixture is determined from the calorific value 11 by means of the correlation between the calorific value 10 and the mixture ratio 12 of the fuel mixture and is deposited in a fifth block 24. The composition of the fuel mixture is thereby known and can be taken into account for the control of the internal combustion engine.

The composition of the fuel mixture is supplied to a sixth block 25 and is taken into account there when determining a media correction factor. The injection mass is determined from the media correction factor and the effective injection time $t_e$ in the multiplier 30. The calorific value 10 deposited in block 23 can also additionally or alternatively be taken into account when determining the media correction factor and thus be fed back to improve the accuracy of the pilot-controlled fuel mass calculation.

The invention claimed is:

1. A method for determining the composition of a fuel mixture consisting of a first fuel and a second fuel to operate an internal combustion engine having at least one cylinder pressure sensor for determining a cylinder pressure (40) in at least one cylinder of the internal combustion engine, comprising determining a calorific value (11) of the fuel mixture or a characteristic variable correlating to said calorific value (11) from the cylinder pressure (40), and determining the composition of the fuel mixture from said calorific value (11) or the correlating characteristic value; wherein an indicated mean effective pressure $p_{mi}$ is determined from a course of the cylinder pressure (40), in that a mean indicated work $W_i$ is determined from the indicated mean effective pressure $p_{mi}$, in that the calorific value (11) or the characteristic variable correlating to said calorific value (11) is determined from the mean indicated work $W_i$ and a fuel quantity injected in the respective combustion cycle, and the composition of the fuel mixture is determined from said calorific value or the characteristic variable correlating thereto.

2. The method according to claim 1, characterized in that an averaging takes place over at least one of different cylinders and a plurality of combustion cycles when determining the calorific value (11) or the characteristic variable correlating to said calorific value (11).

3. The method according to claim 1, characterized in that the composition of the fuel mixture is determined after a check of the error conditions with respect to at least one of the pressure in the fuel system, sufficiently long injection valve opening times, and the course of combustion.

4. The method according to claim 1, characterized in that at least one of the determined calorific value (11), the characteristic variable correlating to said determined calorific value (11), and the composition of the fuel mixture is fed back and taken into account when calculating the injected fuel quantity.

5. The method according to claim 1, characterized in that the determined calorific value or the determined characteristic variable correlating to said calorific value is checked to determine whether said value or respectively the variable correlating to said value has exceeded a theoretical maximum value or has undershot a theoretical minimum value.

6. A method for determining the composition of a fuel mixture consisting of gasoline and ethanol, the method comprising the steps of claim 1.

7. A device for determining the composition of a fuel mixture consisting of a first and a second fuel to operate an internal combustion engine, wherein an internal combustion engine has at least one cylinder pressure sensor for determining the cylinder pressure (40) in at least one cylinder of the internal combustion engine, comprising a control unit for controlling the internal combustion engine, for determining an indicated mean effective pressure $p_{mi}$ and an indicated work $W_i$ from signals of the cylinder pressure sensor during a high pressure loop of a work cycle and for determining an injected fuel quantity, characterized in that a circuit arrangement or a program sequence for determining the calorific value (11) of the fuel mixture as the quotient of the indicated $W_i$ and the injected fuel quantity is provided in the control unit, in that data regarding the correlation between the calorific value (11) and the composition of the fuel mixture are deposited in said control unit and in that a program sequence for determining the composition of the fuel mixture from the determined calorific value (11) and the data regarding the correlation between said calorific value (11) and the composition of the fuel mixture is provided in said control unit; wherein an indicated mean effective pressure $p_{mi}$ is determined from a course of the cylinder pressure (40), in that a mean indicated work $W_i$ is determined from the indicated mean effective pressure $p_{mi}$, in that the calorific value (11) or the characteristic variable correlating to said calorific value (11) is determined from the mean indicated work $W_i$ and a fuel quantity injected in the respective combustion cycle, and the composition of the fuel mixture is determined from said calorific value or the characteristic variable correlating thereto.

8. A method for determining the composition of a fuel mixture consisting of gasoline and ethanol, the method comprising using the device of claim 7.

* * * * *